(12) United States Patent
Gaboriau et al.

(10) Patent No.: US 7,055,045 B1
(45) Date of Patent: May 30, 2006

(54) AUTOMATIC MODE DETECTION CIRCUITS FOR CONFIGURING A TERMINAL AS AN OUTPUT TERMINAL IN A FIRST MODE AS AN INPUT TERMINAL IN A SECOND MODE

(75) Inventors: Johann G. Gaboriau, Austin, TX (US); Xiaofan Fei, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 699 days.

(21) Appl. No.: 10/329,853

(22) Filed: Dec. 26, 2002

(51) Int. Cl.
*G06F 1/30* (2006.01)
*H01L 25/00* (2006.01)
*G01R 31/28* (2006.01)

(52) U.S. Cl. .................. 713/300; 327/565; 714/734
(58) Field of Classification Search ............... 713/300, 713/322, 323; 327/565; 714/734
See application file for complete search history.

(56) References Cited

U.S. PATENT DOCUMENTS

| | | | | |
|---|---|---|---|---|
| RE31,828 E | * | 2/1985 | Raymond et al. ........... | 714/734 |
| 4,835,414 A | * | 5/1989 | Freidin ..................... | 327/565 |
| 6,137,333 A | * | 10/2000 | Williams et al. ............ | 327/261 |
| 6,316,991 B1 | * | 11/2001 | Muyshondt et al. ........ | 327/543 |
| 2004/0210801 A1 | * | 10/2004 | Prasad et al. ............... | 714/700 |

* cited by examiner

*Primary Examiner*—Thomas Lee
*Assistant Examiner*—Suresh K Suryawanshi
(74) *Attorney, Agent, or Firm*—Thompson & Knight LLP; James J. Murphy

(57) ABSTRACT

Mode detection circuitry includes first detection circuitry which detects the presence of a first input signal selectively presented at a first terminal for a first selected time duration and, in response, selectively generating a first control signal indicative of a first mode. Second detection circuitry detects the presence of a second input signal selectively presented at a second terminal for a second selected time duration and, in response, selectively generating a second control signal indicative of a second mode. Control circuitry configures the second terminal as an output terminal in the first mode and as an input terminal in the second mode in response to the first and second control signals.

20 Claims, 2 Drawing Sheets

AUTOMATIC MODE DETECTION CIRCUITS FOR CONFIGURING A TERMINAL AS AN OUTPUT TERMINAL IN A FIRST MODE AS AN INPUT TERMINAL IN A SECOND MODE

FIELD OF INVENTION

The present invention relates in general to electronic circuits, and in particular, to automatic mode detection circuits and methods and systems utilizing the same.

BACKGROUND OF INVENTION

Often integrated circuit blocks are often capable of operating in multiple modes, such as multiple clocking modes, in order to support multiple system-level applications. Typically, when a circuit block operates in a slave clocking mode, a clock signal is input to the circuit block to synchronize its operations with the operations of associated circuit block in the system. During typical master-mode clock operations, a circuit block instead generates the clock signal required to synchronize the operations of a set of associated circuit blocks in the system. In other words, a circuit block operating in a slave-mode receives a controlling signal from another circuit block within the system while the circuit block operating in a master mode generates the controlling clock for transmission to another circuit block within the system.

Clearly, with respects to any circuit block capable of operating in multiple modes, some provision must be made to select the proper mode required by the system application. Currently, mode selection, at either the circuit block or device level, is normally done using one or more dedicated mode select signals. This conventional technique, however, has a number of significant drawbacks. For example, additional circuitry must be provided to both generate and decode the required mode select signals. If these generation and decoding circuits are disposed across circuit block or device boundaries, then additional pads or pins are needed to make the appropriate interconnection. Furthermore, mode select signals generally increase the complexity of the design and the number of factors, which must be considered at the system level.

In sum, a technique is required which allows a multiple-mode capable circuit block or device to be properly configured for correct system-level operation without being subject to the disadvantages of conventional mode selection schemes utilizing dedicated select signals.

SUMMARY OF INVENTION

The principles of the present invention advantageously provide circuitry and methods for detecting the correct operating mode of a circuit or system without dedicated mode selection signals and circuitry. According to one particular embodiment, mode detection circuitry includes first detection circuitry which detects the presence of a first input signal selectively presented at a first terminal for a first selected time duration and, in response, selectively generating a first control signal indicative of a first mode. Second detection circuitry detects the presence of a second input signal selectively presented at a second terminal for a second selected time duration and, in response, selectively generating a second control signal indicative of a second mode. Control circuitry configures the second terminal as an output terminal in the first mode and as an input terminal in the second mode in response to the first and second control signals.

Embodiments of the inventive principles are useful in detecting the correct operating mode in any application in which a given circuit is capable of operating in multiple modes in response to alternate controlling signal sources. These controlling signals are provided from either on-chip or off-chip sources, in the case of an integrated circuit embodiment, and/or define the corresponding circuit or system as a system master or a system slave. For example, the present principles allow for the automatic detection of an incoming master clock when a circuit block is operating in a slave clock mode and for the detection of an incoming crystal output signal when that circuit block is operating in a master mode. The circuit may then be correctly configured to operate from the received master clock in the slave clock mode or to generate the master clock from the crystal output signal to drive other circuit blocks or devices in the master clock mode.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
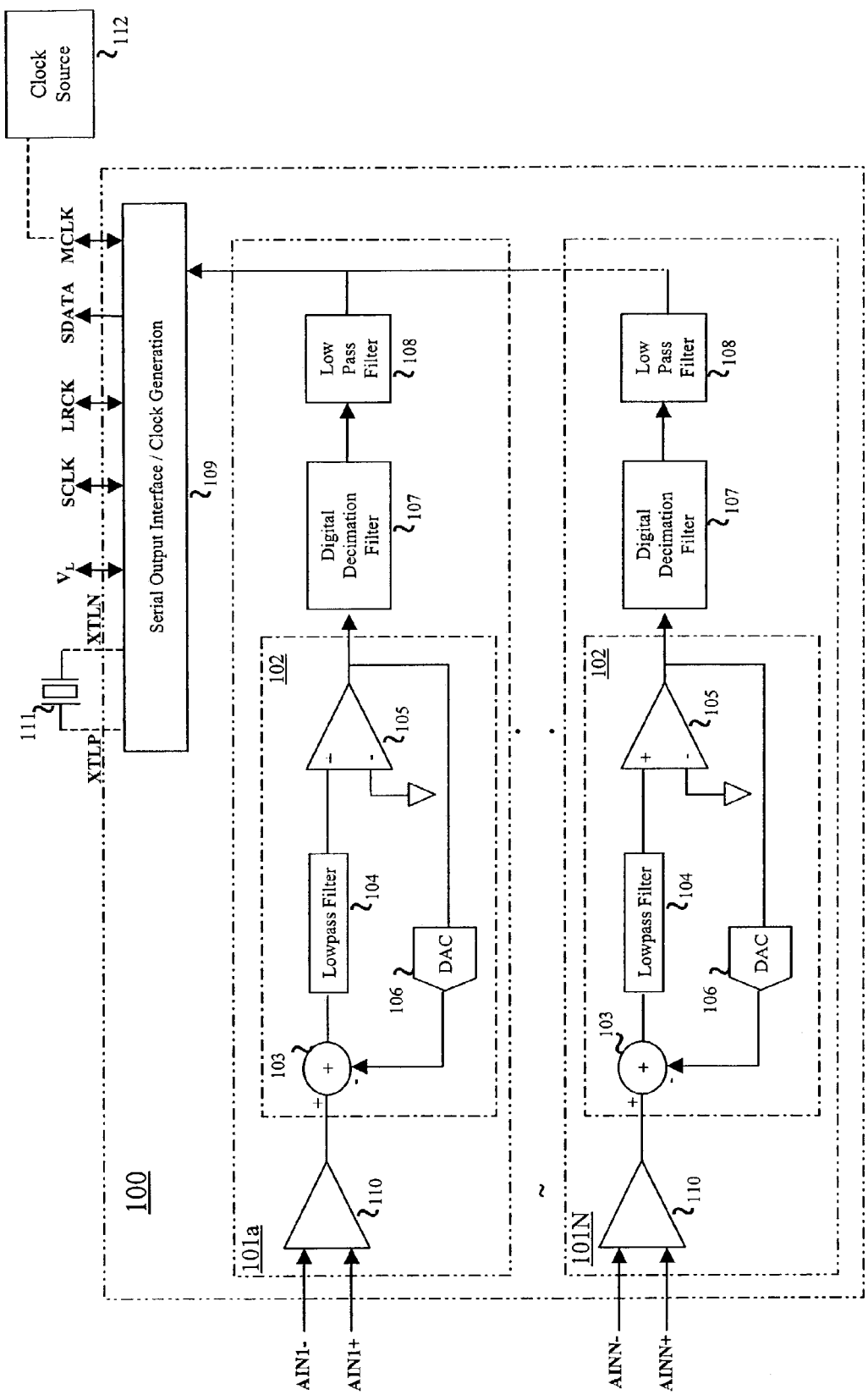
FIG. 1 is a high-level block diagram of a representative single-chip audio analog-to-digital converter (ADC) suitable for practicing the principles of the present invention.
Figure 2:
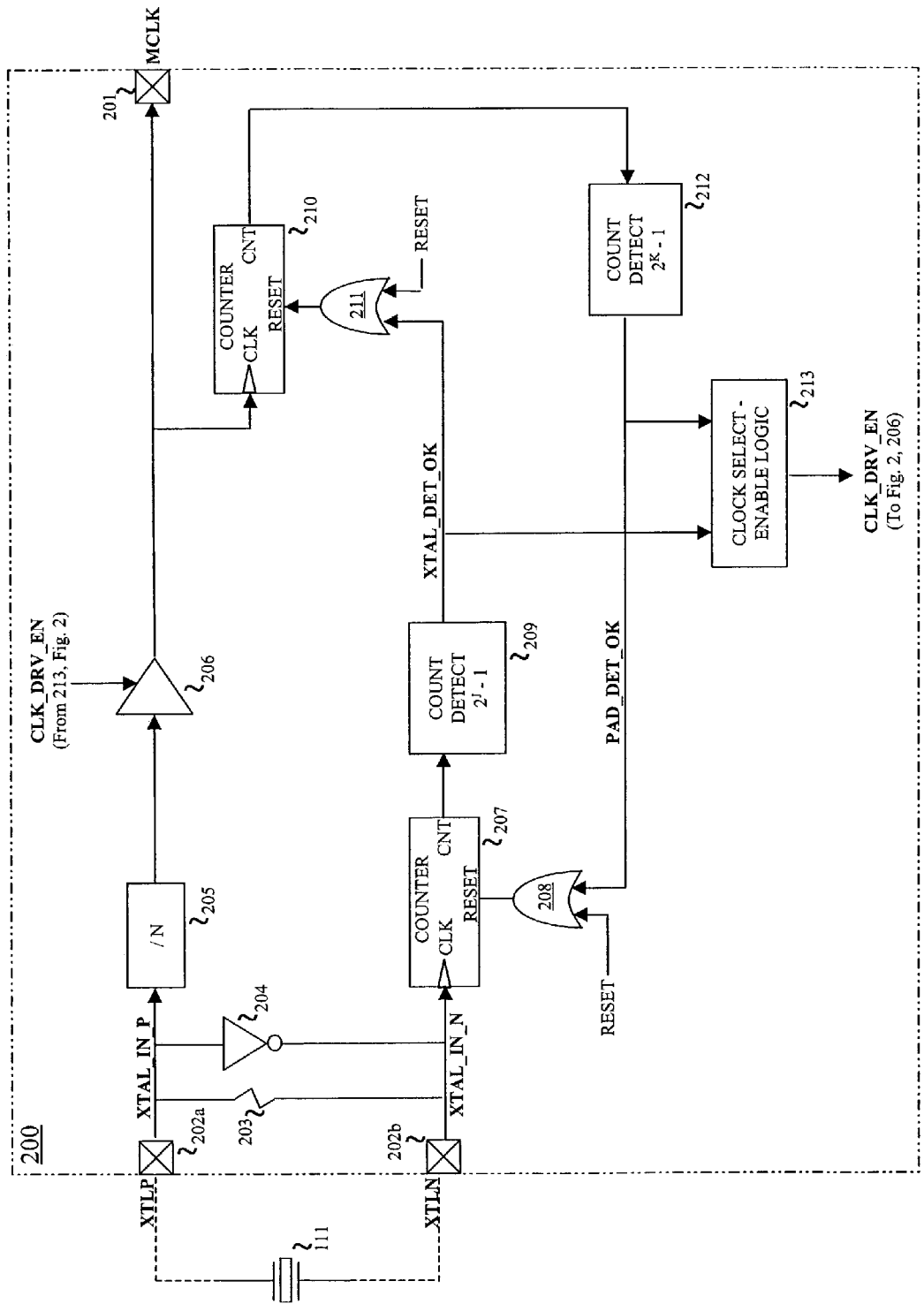
FIG. 2 is a block diagram of a representative signal detection circuit embodying the inventive principles and suitable for use for master-slave clock mode detection and control in the representative ADC shown in FIG. 1.

The principles of the present invention and their advantages are best understood by referring to the illustrated embodiment depicted in FIGS. 1–2 of the drawings, in which like numbers designate like parts.

FIG. 1 is a high-level block diagram of a single-chip audio analog-to-digital converter (ADC) 100 suitable for practicing the principles of the present invention. For illustrative purposes, ADC 100 is a delta-sigma ADC, although the present inventive principles are applicable to other types of ADCs, as well as digital-to-analog converter (DACs) and Codecs.

ADC 100 includes N conversion paths 101a . . . N, of which two paths 101a and 101N are shown for reference, for converting N channels of differential analog audio data respectively received at analog differential inputs AINN+/−, where N is an integer of one (1) or greater. The analog inputs for each channel are passed through an input gain stage 110 and then a delta-sigma modulator 102.

Each delta-sigma modulator 102 is represented in FIG. 1 by a summer 103, low-pass filter 104, comparator (quantizer) 105, and DAC 106 in the delta-sigma feedback loop. The outputs from delta-sigma modulators 102 are each passed through a digital decimation filter 107, which reduces the sample rate, and also a low pass filter 108. Delta sigma modulators 102 sample the corresponding analog input signals at an oversampling rate and output digital data in either single-bit or multiple-bit form, depending on the quantization, at the oversampling rate. The resulting quantization noise is shaped and generally shifted to frequencies above the audio band.

The resulting digital audio data are output through a single serial data port SDATA of serial output interface/ clock generation circuitry 109, timed with a serial clock (SCLK) signal and a left-right clock (sample) signal (LRCLK). In the slave mode, the SCLK and LRCLK signals are generated externally and input to ADC 100 along with the master clock (MCLK) signal generated by an external clock source 112. In the master mode, the master clock (MCLK) signal is generated from an external crystal 111 and thereafter utilized on-chip to generate the SCLK and LRCK signals, which are then output along with the corresponding serial data.

The principles of the present invention advantageously allow for the automatic detection of a signal from a corresponding one of multiple available sources. For illustrative purposes, these principles will be described with respects to the detection of the base MCLK signal of FIG. 1 provided by either external crystal—111 through crystal oscillator ports XTLN and XTLP or external clock source 112 through the MCLK port of serial output interface/clock generation block 109. However, generally, these principles are applicable to the detection of the source of any signal, whether generated on-chip or off-chip, and consequently the corresponding operating mode.

FIG. 2 is a block diagram of a representative signal detection circuit 200 embodying the inventive principles. For discussion purposes signal detection circuit 200 is disposed within serial interface/clock generation block 109 of FIG. 1, although its location within ADC 100 is not critical. Signal detection circuit 109 includes a pair of pads 202a and 202b corresponding to ports XTLP and XTLN for selective coupling to external crystal 111 in a first (master) mode and a MCLK pad 201 for outputting the resulting MCLK signal to other on-chip circuitry within ADC 100 and/or external devices coupled to ADC 100. In a second (slave) mode, MCLK pad 201 receives the MCLK signal from a clock source located elsewhere within ADC 100 or from external clock source 112 coupled to ADC 100 through the MCLK port of serial interface/clock generation block 109.

In the first mode, external crystal 111 drives an oscillator circuit represented in FIG. 2 by a resistor 203 and an inverter 204 coupled together in parallel, which generates an internal clock signal XTAL_IN_P having a given base frequency. A frequency divider 205, such as a phase-locked loop, divides the base frequency of the XTAL_IN_P signal by a factor N to generate the MCLK signal of the desired frequency. A tri-state buffer (amplifier) 206 is enabled in the first mode by the active state of control signal CLK_DRV_EN and drives MCLK pad 201 with the MCLK signal generated by frequency divider 205. In the second mode, tri-state buffer 206 is disabled by the inactive state of the CLK_DRV_EN signal while pad 201 is being driven with the MCLK signal. Generation of the active and inactive states of the CLK_DRV_EN signal is discussed further below.

When crystal 111 is coupled to XTLP and XTLN pads 202a and 202b and powered, the oscillator frequency is monitored by a first counter 207. In the illustrated embodiment, first counter 207 is edge-triggered and, when enabled by the output from OR-gate 208, increments with each period of the signal XTAL_IN_N, which is the complement of the XTAL_IN_P signal discussed above. First counter 207 is enabled when both the global reset signal RESET and the control signal PAD_DET_OK are in an inactive low state. If the count in first counter 207 reaches a preselected value before counter 207 is disabled by the output of OR-gate 208, in this example $2^J-1$, in which J is an integer greater than one, first count detect circuitry 209 sets the control signal XTAL_DET_OK to an active high state. The active state XTAL_DET_OK signal also disables a second counter 210 monitoring MCLK pad 201 through OR-gate 211.

Second counter 210, when enabled by OR-gate 211, counts the frequency of the MCLK signal driving pad 201 during the second mode. Specifically, OR-gate 211 enables second counter 210 when both the RESET signal and the signal XTAL_DET_OK from first counter 207 are in an inactive low state. If the count in second counter 210 reaches a preselected value before second counter 210 is disabled by the output of OR-gate 211, in this example $2^K-1$, in which K is an integer greater than one, second count detect circuitry 209 sets the control signal PAD_DET_OK to an active high state. The active state of the PAD_DET_OK signal disables first counter 207 through OR-gate 208.

The states of the XTAL_DET_OK and PAD_DET_OK signals are decoded by clock select—enable logic 213 which generates the CLK_DRV_EN signal controlling tri-state buffer 206 in accordance with Table 1:

TABLE 1

| XTAL_DET_OK | PAD_DET_OK | CLK_DRV_EN |
| --- | --- | --- |
| 1 | 0 | 1 |
| 1 | 1 | 0 |
| 0 | 0 | 0 |
| 0 | 1 | 0 |

As indicated in the first line of Table 1, when an external crystal oscillator 111 is driving pads 202a and 202b, through corresponding ports XTLN and XTLP, and MCLK pad 201 is not being driven by another signal (i.e., the first or master mode), then tri-state buffer 206 is enabled to drive MCLK pad 202 from the output of divider circuitry 205. On the other hand, as indicated in the last line of Table 1, when pad 202 is being driven by an MCLK signal from another circuit-on or off-chip during the second (slave) mode, then tri-state buffer 206 is disabled. The second line of Table 1 describes the case when a crystal oscillator 111 is driving pads 202a and 202b, through ports XTLP and XTLN, and clock source 112 simultaneously is driving MCLK pad 201. Under these conditions, tri-state buffer 206 is disabled and the external crystal 111 is electrically decoupled from the remainder of ADC 100. Similarly, tri-state buffer 206 is disabled if neither a crystal oscillator signal is present at pads 202a and 202b (ports XTLP and XTLN) nor a signal from clock source 112 is driving pad 202, as described by the third line of Table 1.

While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed is:

1. Mode detection circuitry comprising:
   first detection circuitry for detecting the presence of a first input signal selectively presented at a first terminal for a first selected time duration and, in response, selectively generating a first control signal indicative of a first mode;
   second detection circuitry for detecting the presence of a second input signal selectively presented at a second terminal for a second selected time duration and, in response, selectively generating a second control signal indicative of a second mode;

control circuitry for configuring the second terminal as an output terminal in the first mode and as an input terminal in the second mode in response to the first and second control signals.

2. The mode detection circuitry of claim 1, wherein the first selected time duration differs from the second selected time duration.

3. The mode detection circuitry of claim 1, wherein the first selected time duration and the second selected time duration are substantially equal.

4. The mode detection circuitry of claim 1, wherein the first control signal selectively disables the second detection circuitry in the first mode and the second control signal selectively disables the first detection circuitry in the second mode.

5. The mode detection circuitry of claim 1, wherein a selected one of the first detection circuitry and the second detection circuitry comprises:
   a counter for counting periods of an input signal present at the first terminal, wherein the counter is reset by a first state of the second control signal; and
   a count detector for monitoring a count in the counter and, in response, selectively generating a first state of the first control signal.

6. The mode detection circuitry of claim 1, further comprising a buffer selectively enabled by the control circuitry for selectively driving the second terminal during the first mode with a signal corresponding to an input signal present on the first terminal.

7. The mode detection circuitry of claim 1, further comprising circuitry for generating an output signal of a selected frequency for output from the second terminal in the first mode in response to an input signal present at the first terminal.

8. The mode detection circuitry of claim 5, wherein the circuitry for generating an output signal comprises:
   oscillator circuitry for generating a signal in response to a crystal output signal present at the first terminal; and
   divider circuitry for selectively dividing the clock signal to generate the output signal.

9. The mode detection circuitry of claim 8, wherein counting the periods of the first input signal comprises counting the periods of the first input signal with a counter selectively enabled by the second control signal.

10. The mode selection circuitry of claim 8, wherein counting the periods of the second input signal comprises counting the periods of the second input signal with a counter selectively enabled by the first control signal.

11. The mode detection circuitry of claim 8, wherein counting the periods of the first input signal comprises generating an active state of the first control signal when a number of periods of the first input signal reaches a preselected threshold.

12. The mode detection circuitry of claim 8, wherein counting the periods of the second input signal comprises generating an active state of the second control signal when a number of periods of the second input signal reaches a preselected threshold.

13. The mode detection circuitry of claim 8, wherein at least one of the first and second input signals comprises a clock signal.

14. A system operable to automatically detect an operating mode and control output of a master signal in a master mode and input of the master signal in a slave operating mode, comprising:
   a first counter for counting periods of a first selectively received input signal;
   a first count detector for setting a first control signal in a first state when a count in the first counter is below a first selected threshold and in a second state when the count in the first counter is above the first selected threshold;
   a second counter for counting periods of a second selectively received input signal, the second counter enabled by the first state of the first control signal;
   a second count detector for setting a second control signal in the first state when a count in the second counter is below a second selected threshold and in the second state when the count in the second counter is above the second selected threshold, the first counter enabled by the first state of the second control signal; and
   master signal source selection circuitry controlling the output of the master signal in the master mode in response to the first state of the first control signal and the second state of the second control signal and the input of the master signal in the slave mode in response to the second state of the first control signal and the first state of the second control signal.

15. The system of claim 14, further comprising signal generation circuitry for generating the master signal in the master mode from an associated crystal.

16. The system of claim 14, wherein the master clock signal comprises an audio master clock signal.

17. The system of claim 14, wherein the system comprises a portion of data converter.

18. The system of claim 14, wherein the system is fabricated on a single integrated circuit chip and the master signal is received from an off-chip signal source.

19. The system of claim 14, wherein the master signal source selection circuitry comprises a tri-state buffer for driving the master signal in the master mode and clock select logic for controlling the tri-state buffer in response to the states of the first and second control signals.

20. The system of claim 14, wherein the master signal source selection circuitry inputs the master in the slave mode when the first and second control signals are both in a corresponding one of the first and second states.

\* \* \* \* \*